(12) United States Patent
Manalo

(10) Patent No.: US 7,858,054 B2
(45) Date of Patent: Dec. 28, 2010

(54) DEVICE FOR REFORMING GAS VAPOR OF AN INTERNAL COMBUSTION ENGINE

(76) Inventor: Romeo Manalo, 10685 Curtis St., Loma Linda, CA (US) 92354

( * ) Notice: Subject to any disclaimer, the term of this patent is extended or adjusted under 35 U.S.C. 154(b) by 1152 days.

(21) Appl. No.: 11/484,551

(22) Filed: Jul. 12, 2006

(65) Prior Publication Data

US 2008/0014131 A1    Jan. 17, 2008

(51) Int. Cl.
*B01J 19/08* (2006.01)
*F02M 27/04* (2006.01)

(52) U.S. Cl. .................................. 422/186.04; 123/536

(58) Field of Classification Search ............ 422/186.04; 123/536
See application file for complete search history.

(56) References Cited

U.S. PATENT DOCUMENTS 6,502,562 B1 * 1/2003 Manalo ...................... 123/536
7,004,152 B2 * 2/2006 Manalo ...................... 123/536

* cited by examiner

*Primary Examiner*—Kishor Mayekar

(57) ABSTRACT

A device for reforming gas vapors of an internal combustion engine comprising a voltage multiplier unit, a gas vapor treatment means and a gas vapor reforming means disposed within the gas vapor treatment means and in communication with said voltage multiplier unit, said gas vapor treatment means having a treatment chamber in communication with a gas vapor intake port and gas vapor discharge port, gas vapor intake port being capable of communicating with air passages of the internal combustion engine and said gas vapor discharge port being capable of communicating with said air induction system, said gas vapor reforming means is preferably an electronic emitter disposed within the treatment chamber being capable of introducing electrons for dissociating ions of gas vapor being introduced therein, characterized in that a current regulating means being in communication with said voltage multiplier unit and gas vapor reforming means, said current regulating means is being made such that it is capable of automatically controlling the flow of current from the voltage multiplier unit to the gas vapor reforming means.

3 Claims, 2 Drawing Sheets

DEVICE FOR REFORMING GAS VAPOR OF AN INTERNAL COMBUSTION ENGINE

TECHNICAL FIELD

The present invention relates generally to enhancement of internal combustion engine performance and more specifically to an improved device for reforming vented out gases, to produce ionized hydrocarbon gas vapors, adapted to be fed back to the combustion chamber of the engine to enhance is combustion performance.

BACKGROUND OF THE INVENTION

The present invention is actually an improvement of the device for reforming gas vapor disclosed in U.S. Pat. No. 7,004,152 B2 and pending Ph Patent application bearing Application No. 1-2001-00926 under the same inventor.

Said patent discloses a device for reforming gas vapors of an internal combustion engine having an air reduction system, a combustion chamber, positive crankcase and fuel tank associated therewith. The device comprises a voltage multiplier unit, a gas vapor treatment means and a gas vapor reforming means disposed within the gas vapor treatment means and in communication with the voltage multiplier unit. The gas vapor treatment means having a treatment chamber in communication with a gas vapor intake port and gas vapor discharge port. Said gas vapor intake port being capable of communicating with the positive crankcase and fuel tank of the engine, and said gas vapor discharge port being capable of communicating with the engine's air induction system. The gas vapor reforming means is an electronic emitter disposed within the treatment chamber that defines therein a first chamber section and a second chamber section. Said first and second chamber sections having predetermined volumetric area suitable of providing ample space for dissociation of gas vapor therein. The electronic emitter is further provided with gas vapor passages such that the gas vapor from the first chamber section can flow to the second chamber section. The first chamber section serves as the untreated gas vapor section and the second chamber section serves as the reformed gas vapor section. Said electronic emitter being capable of introducing electrons within the treatment chamber such that the gas vapor coming from the positive crankcase and fuel tank will be reformed within the treatment chamber. The variable voltage capacity of the electronic emitter is between approximately 5 KV and approximately 7 KV of electromotive force.

The aforesaid device has observed to be effective in reforming vented out gas, however, some positive developments has to be introduced to further enhance its performance. It was noted that during dissociation of ions, there is continuous circulation and crowding of the negatively charged ions of the reformed hydrocarbon gas vapors in the treatment chamber. Such circulation and crowding result in the binding or merging of those negatively charged ions, such that they are converted to positive radicals and forms a heavy composition of hydrocarbon before being oxidized. The formation causes the hydrocarbon being fed to the combustion chamber to have low performance capability.

SUMMARY

The herein invention is aimed at solving the above-mentioned problem by providing means for intermittently regulating the treatment of incoming hydrocarbon gases in the treatment chamber. Such regulation can limit the reforming of the gas vapor into positive and negative ions, whereby a regulated reformed gas vapor can only accumulate in the treatment chamber suited for enhancing the performance of the engine.

The means for regulating the treatment is a current regulating means that automatically shut off the flow of current to the electronic emitter at a predetermined time. It may be connected in the line connecting the voltage multiplier unit and the gas vapor treatment means or in the lines connecting the voltage multiplier unit to the power source. Said current regulating means preferably includes a timer, electron sensor and ion sensor or a combination of the same.

Other advantage of the improved device for reforming gas vapor is that it can increase the ionizing process without the possibility of heavy composition of hydrocarbon before it is oxidized, thereby an effective feeding of reformed gas vapor to the gas chamber of the engine can be achieved.

Other advantages of the present invention can be realized upon reading the following description taken in conjunction with the accompanying drawings.

DETAILED DESCRIPTION OF THE PREFERRED EMBODIMENT OF THE INVENTION

Figure 1:
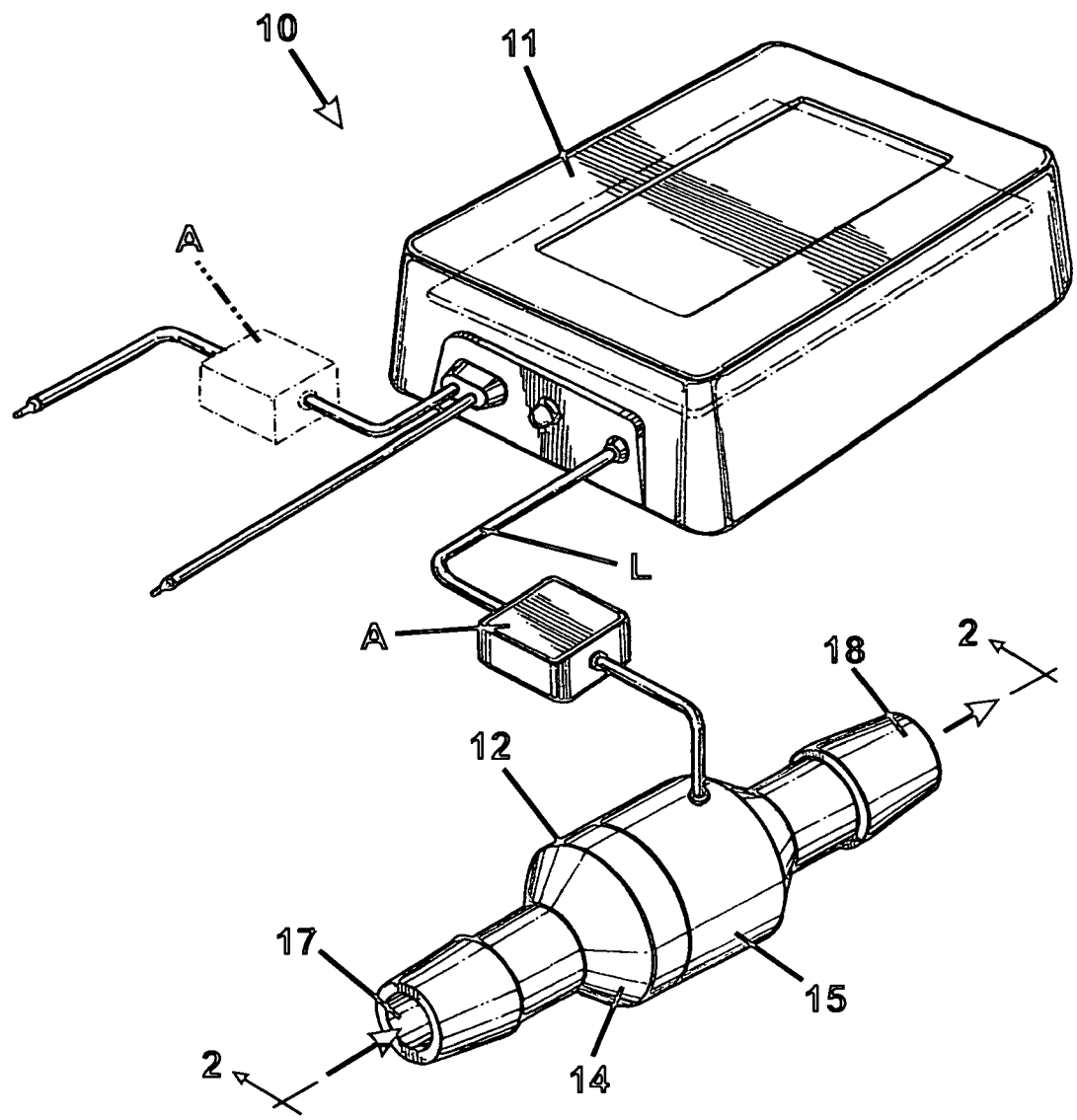
FIG. 1 is a perspective view of the device for reforming gas vapors of an internal combustion engine showing the current regulating means connected thereof.
Figure 2:
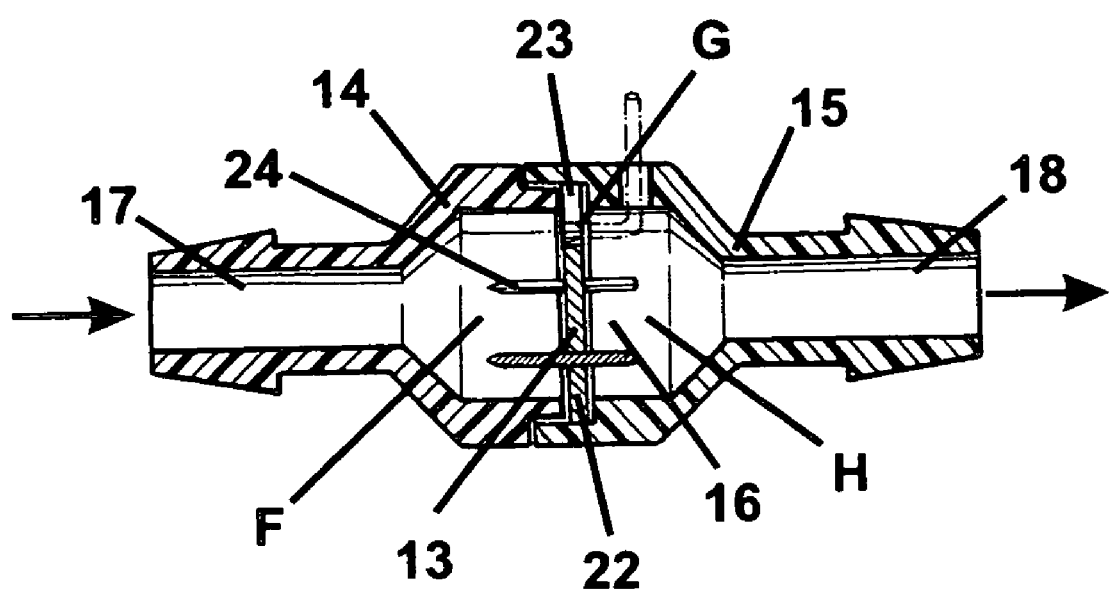
FIG. 2 is a cross-sectional view of the gas vapor treatment means of the present invention.

Referring to the drawings, there is shown a device for reforming gas vapors of an internal combustion engine generally designated as 10 comprising a voltage multiplier unit 11, a gas vapor treatment means 12, and a gas vapor reforming means 13 disposed within the gas vapor treatment means 12 and in communication with said voltage multiplier unit Voltage multiplier unit 11 adapted to be connected to the battery of an internal combustion engine system and the gas vapor treatment means being in communication with the engine. Preferably, gas vapor treatment means can be attached to any gas vents or air passages of the internal combustion engine. Said gas vapor treatment means 12 is a hollow body being capable of receiving and discharging gas vapor. It may be formed by a pair of hollow pieces 14 and 15 being connected to each other defining a treatment chamber 16. A constricted gas vapor intake port 17 provided on one of said pieces and a constricted reformed gas vapor discharge port 18 disposed on the other piece, both in communication with said treatment chamber. To gas vapor intake port is adapted to be connected a gas vent or air passage of the engine, and to gas vapor discharge port is adapted to be connected the air induction system of the engine. Being held within chamber 16 is the gas vapor reforming means 13, which is preferably an electronic emitter having the capacity of emitting high potential at the tip of one or more needles or whiskers through passage of a high electromotive force derive from the low voltage electrical system of the engine. According to a preferred embodiment, the gas vapor reforming means is an electronic emitter consisting of a conductive piece 22 having a plurality of notches 23 provided at the edges thereof, and a plurality of electron needles or whiskers 24 spacedly held on conductive piece 22. Said conductive piece 22 is disposed within the treatment chamber in a manner wherein it serves as a dividing wall therein and defines a first chamber section F and a second chamber section H. The first chamber section F serves as the untreated gas vapor section and the second chamber section H serves as the reformed gas vapor section. First and second chamber sections F and H having predetermined volumetric area suitable for completely treating the gas vapors therein before it flows to the reformed gas vapor discharge port and unto the air induction system of the engine. Conductive piece 22 is provided with notches which defines gas passages G in relation to the inner wall of the treatment chamber. Gas passages G may also be in the form of a plurality of spaced holes or slots disposed on the conductive piece.

The voltage multiplier unit of the invention may be designed such that its voltage generating capacity may be varied or fixed such that the electromotive force passing through the electron needles is within 5 KV to 7 KV or 30 to 90 micro amp. This electromotive force is potential in introducing an ideal quantity of electrons that would reform completely the gas vapors introduced in the treatment chamber.

The improvement as herein proposed is the provision of an electric current regulating means A fixedly connected to the electrical lines L of the device for reforming gas vapors. Said current regulating means may be attached in a manner wherein the flow of current to the conductive piece 22 is electronically controlled. It is connected in the device in a manner wherein it may be in communication with the voltage multiplier unit 11 and gas vapor reforming means 13 and disposed therebetween, or it can be in communication with the voltage multiplier unit and disposed before the entry of current from the power source to the voltage multiplier unit. Said current regulating means A is being attached to the device such that it is capable of regulating the reformation of untreated gas vapors to a predetermined extent, thereby minimizing the possibility of forming heavy composition of hydrocarbon, which may result in an insufficient aid in enhancing the performance of the engine. The current regulating means works in a manner wherein it will automatically shut-off the flow of current to the conductive piece 22 at a predetermined time until a predetermined amount of reformed gas vapor in the treatment chamber has already fed in the combustion chamber of the engine. It will then automatically resume the flow of current upon sensing the depletion of reformed gas vapor in the treatment chamber. Current regulating means A is preferably a device that includes electronic timer, ion regulating sensor, and electron regulating sensor, or a combination of the same. Preferably, the sensors are made in a manner wherein it is capable of sensing the amount of ions or electrons in the gas vapor treatment chamber and automatically shuts-off the flow of current if the ions or electrons is too much and allows the flow of current to flow in the vapor reforming means or emitter if the amount is less. The structure of the aforesaid devices is considered conventional and further discussion regarding them is already considered obvious.

I claim:

1. A device for reforming gas vapors of an internal combustion engine comprising a voltage multiplier unit, a gas vapor treatment means and a gas vapor reforming means disposed within the gas vapor treatment means and in communication with said voltage multiplier unit, said gas vapor treatment means having a treatment chamber in communication with a gas vapor intake port and a gas vapor discharge port, said gas vapor intake port being made such that it is capable of communicating with air passages of the internal combustion engine and said gas vapor discharge port adapted to be attached to an air induction system, said gas vapor reforming means is an electronic emitter disposed within the treatment chamber being capable of introducing electrons for dissociating ions of gas vapor being introduced therein, the device further comprising a current regulating means being in communication with said voltage multiplier unit and gas vapor reforming means, said current regulating means is being made such that it is capable of automatically controlling the flow of current from the voltage multiplier unit to the gas vapor reforming means.

2. A device for reforming gas vapors of an internal combustion engine according to claim 1 wherein said current regulating means is an electronic regulating device such as an ion regulating sensor and electron regulating sensor.

3. A device for reforming gas vapors of an internal combustion engine according to claim 1 wherein said current regulating means is in communication with a power source and said voltage multiplier unit, such that it is capable of controlling the flow of electric current from said power source to the voltage multiplier unit.

* * * * *